United States Patent
Hosoi et al.

(10) Patent No.: US 8,649,107 B2
(45) Date of Patent: Feb. 11, 2014

(54) ZOOM LENS AND IMAGING APPARATUS

(75) Inventors: Masaharu Hosoi, Kanagawa (JP); Motoyuki Otake, Saitama (JP); Naoki Miyagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 25 days.

(21) Appl. No.: 13/371,495

(22) Filed: Feb. 13, 2012

(65) Prior Publication Data

US 2012/0212833 A1    Aug. 23, 2012

(30) Foreign Application Priority Data

Feb. 17, 2011    (JP) ................................ 2011-031661

(51) Int. Cl.
  *G02B 15/14*    (2006.01)
(52) U.S. Cl.
  USPC ............................ 359/684; 359/682; 359/686
(58) Field of Classification Search
  USPC ..................... 359/680–682, 686, 689, 684
  See application file for complete search history.

(56) References Cited

U.S. PATENT DOCUMENTS

| | | | |
|---|---|---|---|
| 5,078,481 A * | 1/1992 | Nakayama et al. | 359/680 |
| 2005/0030641 A1* | 2/2005 | Kuba et al. | 359/686 |
| 2008/0231968 A1* | 9/2008 | Souma | 359/686 |
| 2010/0045808 A1* | 2/2010 | Matsusaka et al. | 348/220.1 |

FOREIGN PATENT DOCUMENTS

| | | |
|---|---|---|
| JP | 2009-128693 | 6/2009 |
| JP | 2009-282465 | 12/2009 |
| JP | 2010-249959 | 11/2010 |

* cited by examiner

*Primary Examiner* — Scott J Sugarman
*Assistant Examiner* — Mustak Choudhury
(74) *Attorney, Agent, or Firm* — Rader, Fishman & Grauer PLLC

(57) ABSTRACT

A zoom lens includes: a first lens group having negative refractive power; a diaphragm; a second lens group having positive refractive power; a third lens group having negative refractive power; and a fourth lens group having positive refractive power, arranged in order from an object side. The first lens group is configured by at least one negative lens and one positive lens. The third lens group is configured by one negative lens. Then power is changed from a wide angle end state to a telephoto end state, the first, second, and third lens groups are moved in the direction of an optical axis, and the fourth lens group is fixed. When focusing, the third lens group is moved in the direction of the optical axis so as to satisfy the following Conditional Equations, $$-2.8 < f3/fw < -0.5 \quad (1)$$

$$2.0 < f4/fw < 15.0 \quad (2).$$

6 Claims, 17 Drawing Sheets

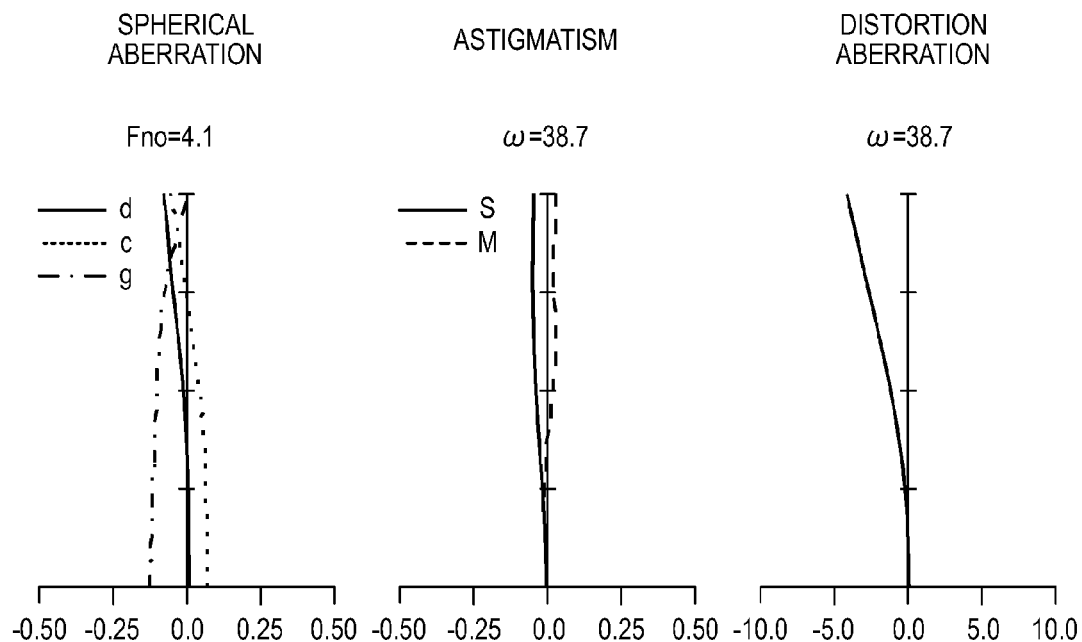

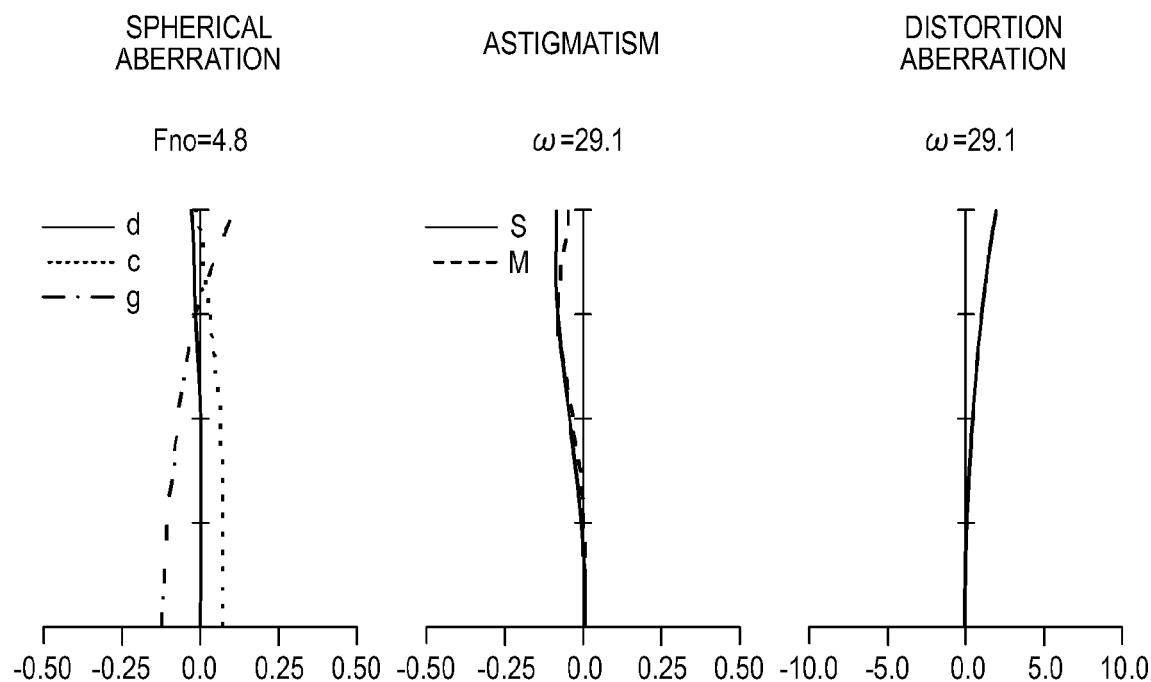

SPHERICAL ABERRATION  
Fno=5.8

ASTIGMATISM  
ω=21.4

DISTORTION ABERRATION  
ω=21.4

FIG.15A SPHERICAL ABERRATION Fno=4.9

FIG.15B ASTIGMATISM ω=27.8

FIG.15C DISTORTION ABERRATION ω=27.8

ZOOM LENS AND IMAGING APPARATUS

FIELD

The present disclosure relates to a zoom lens and an imaging apparatus, and more particularly, to a zoom lens that is suitable as an imaging lens system used in an interchangeable lens device of a so-called interchangeable lens digital camera and an imaging apparatus using the zoom lens.

BACKGROUND

Recently, interchangeable lens digital cameras have been rapidly spread into the market. Particularly, since moving images can be captured in an interchangeable lens camera system, a zoom lens that is suitable not only for capturing a still image but also for capturing a moving image is demanded. When a moving image is captured, in order to follow up a rapid movement of a subject, it is necessary to move a focusing lens group at high speed.

There are many types of zoom lens used for an interchangeable lens camera system. Among them, as a lens type that is suitable for miniaturization and zoom magnification of about three times, a type is known in which a first group having negative refractive power and a second group having positive refractive power are arranged in order from the object side (for example, see JP-A-2009-282465, JP-A-2009-128693, or JP-A-2010-249959). Generally, the zoom lens of this type moves the whole or a part of the first group in the direction of the optical axis when focusing is performed.

SUMMARY

In the above-described related art, the first lens group having negative refractive power and the second lens group having positive refractive power are arranged in order from the object side, and focusing is performed by moving the first lens group or a part thereof in the direction of the optical axis. However, in order to move the first lens group at high speed for focusing, since the weight of the first lens group is heavy, the size of a driving actuator increases, whereby there is a problem in that the size of the lens barrel increases.

Thus, it is desirable to provide a zoom lens that is compact and performs focusing at high speed.

An embodiment of the present disclosure is directed to a zoom lens including: a first lens group that has negative refractive power; a diaphragm; a second lens group that has positive refractive power; a third lens group that has negative refractive power; and a fourth lens group that has positive refractive power, which are arranged in order from an object side. The first lens group is configured by at least one negative lens and one positive lens, the third lens group is configured by one negative lens, and, when power is changed from a wide angle end state to a telephoto end state, the first lens group, the second lens group, and the third lens group are moved in the direction of an optical axis, and the fourth lens group is fixed. In addition, when focusing is performed, the third lens group is moved in the direction of the optical axis so as to satisfy the following Conditional Equations (1) and (2).

$$-2.8 < f3/fw < -0.5 \quad (1)$$

$$2.0 < f4/fw < 15.0 \quad (2)$$

Here, f3 is a focal length of the third lens group, f4 is a focal length of the fourth lens group, and fw is a focal length of the whole zoom lens system at infinite focusing in the wide angle end state. According to the above-described zoom lens, there is an advantage that the weight of the third lens group is decreased.

In the above-described zoom lens, the negative lens of the first lens group may be configured by a negative meniscus lens that has a convex surface facing the object side. In addition, the first lens group may be configured by a negative meniscus lens having a convex surface facing the object side and a positive meniscus lens having a convex surface facing the object side in order from the object side. In such a case, there is an advantage that the length of the whole lens can be configured to be compact while the distortion aberration, the coma aberration, and the chromatic aberration of magnification are corrected favorably.

In addition, in the above-described zoom lens, the following Conditional Equations (3) and (4) may be satisfied.

$$nd3 < 1.75 \quad (3)$$

$$vd3 > 40 \quad (4)$$

Here, nd3 is a refractive index of the medium of the negative lens of the third lens group for the D line (wavelength 587.6 nm), and vd3 is the Abbe number of the medium of the negative lens of the third lens group for the D line (wavelength 587.6 nm). In such a case, there are advantages that the weight of the third lens group is decreased further, and the variation of the aberration according to the movement of the focus is suppressed.

In the above-described zoom lens, the following Conditional Equation (5) may be satisfied.

$$0.5 < f2/fw < 1.2 \quad (5)$$

Here, f2 is the focal length of the second lens group.

In such a case, there is an advantage that the length of the whole lens is decreased further while the eccentricity sensitivity is suppressed.

In addition, in the above-described zoom lens, the fourth lens group may be configured by one positive lens. In such a case, there is an advantage that the cost of the raw material decreases.

In addition, in the above-described zoom lens, the second lens group may be configured by a positive lens, a negative lens, and a positive lens in order from the object side. In such a case, there is an advantage that the spherical aberration, the astigmatism, and the chromatic aberration are corrected favorably by using a small number of lenses.

Furthermore, in the above-described zoom lens, the second lens group may be configured by a positive lens, a positive lens, and a negative lens in order from the object side. In such a case, there is an advantage that the spherical aberration, the astigmatism, and the chromatic aberration can be corrected favorably by using a small number of lenses.

Another embodiment of the present disclosure is directed to an imaging apparatus including: a zoom lens that is configured by a first lens group that has negative refractive power, a diaphragm, a second lens group that has positive refractive power, a third lens group that has negative refractive power, and a fourth lens group that has positive refractive power, which are arranged in order from an object side; and an imaging device that converts an optical image formed by the zoom lens into an electrical signal, wherein the first lens group is configured by at least one negative lens and one positive lens. The third lens group is configured by one negative lens, and, when power is changed from a wide angle end state to a telephoto end state, the first lens group, the second lens group, and the third lens group are moved in the direction of an optical axis, and the fourth lens group is fixed. In addition, when focusing is performed, the third lens group is moved in the direction of the optical axis so as to satisfy the following Conditional Equations (1) and (2).

$$-2.8 < f3/fw < -0.5 \tag{1}$$

$$2.0 < f4/fw < 15.0 \tag{2}$$

Here, f3 is a focal length of the third lens group, f4 is a focal length of the fourth lens group, and fw is a focal length of the whole zoom lens system at infinite focusing in the wide angle end state. According to the above-described imaging apparatus, there is an advantage that the weight of the third lens group is decreased.

The embodiments of the present disclosure provide a superior advantage that a compact zoom lens performing focusing at high speed can be provided.

BRIEF DESCRIPTION OF THE DRAWINGS

FIGS. 10A to 10C are diagrams illustrating aberrations of the zoom lens according to the third embodiment at the wide angle end.

FIGS. 11A to 11C are diagrams illustrating aberrations of the zoom lens according to the third embodiment at an intermediate focal length between the wide angle end and the telephoto end.

DETAILED DESCRIPTION

Figure 1:
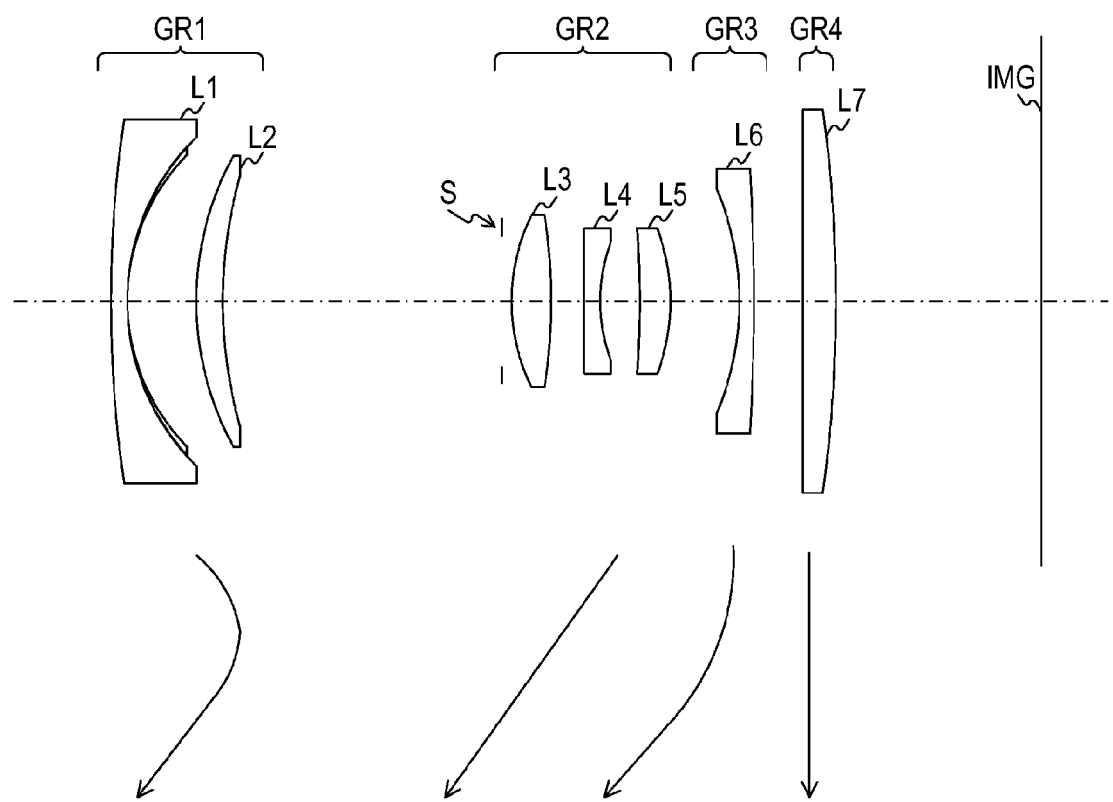
FIG. 1 is a diagram illustrating the lens configuration of a zoom lens according to a first embodiment.

A zoom lens according to an embodiment of the present disclosure is configured by a first lens group GR1 having negative refractive power, a second lens group GR2 having positive refractive power, a third lens group GR3 having negative refractive power, and a fourth lens group GR4 having positive refractive power, in order from the object side. The first lens group GR1 is configured at least by one negative lens L1 and one positive lens L2. The third lens group GR3 is configured by one negative lens L6. When power is changed from the wide angle end state to the telephoto end state, the first lens group GR1, the second lens group GR2, and the third lens group GR3 are moved in the direction of the optical axis, and the fourth lens group GR4 is fixed. In the zoom lens according to the embodiment of the present disclosure, when focusing is performed, the third lens group GR3 is moved in the direction of the optical axis. Here, since the third lens group GR3 is configured by one negative lens and has a light weight, it can be moved at high speed by a small-size actuator.

The zoom lens according to the embodiment of the present disclosure is configured so as to satisfy Conditional Equation (1) represented below.

$$-2.8 < f3/fw < -0.5 \tag{1}$$

Here, f3 is a focal length of the third lens group, and fw is a focal length of the whole zoom lens system at infinity focusing in the wide angle end state.

This Conditional Equation (1) defines the focal length of the third lens group GR3 as a focusing lens group with respect to the focal length of the whole zoom lens system at infinity focusing in the wide angle end state. In a case where the ratio is below the range represented in Conditional Equation (1), a distance between the focus position at infinity object focusing and a focus position at focusing a short-distance object, that is, a focus stroke is lengthened, and the entire lens length is lengthened. On the other hand, in a case where the ratio is above the range represented in Conditional Equation (1), a change in the position of the image surface according to the movement of the focusing lens is too large, and accordingly, the stopping accuracy that is necessary for the actuator is high. In addition, since the eccentricity sensitivity is high, the degree of manufacturing difficulty is high.

In addition, in the range represented in Conditional Equation (1), it is preferable to satisfy the following Conditional Equation (1').

$$-2.0 < f3/fw < -0.7 \tag{1'}$$

Furthermore, in the range represented in Conditional Equation (1), it is more preferable to satisfy the following Conditional Equation (1"). In such a case, the entire lens length can be decreased further while the eccentricity sensitivity is suppressed.

$$-1.7 < f3/fw < -0.9 \tag{1"}$$

In addition, the zoom lens according to the embodiment of the present disclosure is configured so as to satisfy the following Conditional Equation (2).

$$2.0 < f4/fw < 15.0 \tag{2}$$

Here, f4 is a focal length of the fourth lens group, and fw is a focal length of the whole zoom lens system at infinite focusing in the wide angle end state.

This Conditional Equation (2) defines the focal length of the fourth lens group GR4 with respect to the focal length of the whole zoom lens system at infinite object focusing in the wide angle end state. In a case where the ratio is below the range represented in Conditional Equation (2), the power of the fourth lens group GR4 is high, and accordingly, it is difficult to secure a sufficient back focus. In addition, in a case where the power of the fourth lens group GR4 is high, the eccentricity sensitivity increases, and accordingly, the manufacturing difficulty increases. On the other hand, in a case where the ratio is above the range represented in Conditional Equation (2), the power of the fourth lens group GR4 is too low, and accordingly, the effect of the aberration correction of the fourth lens group GR4 decreases. Particularly, the distortion aberration deteriorates.

In addition, in the range represented in Conditional Equation (2), it is preferable to satisfy the following Conditional Equation (2').

$$2.0 < f4/fw < 9.0 \tag{2'}$$

Furthermore, in the range represented in Conditional Equation (2), it is more preferable to satisfy the following Conditional Equation (2"). In such a case, the aberrations can be suppressed favorably while a sufficient back focus is secured.

$$2.5 < f4/fw < 7.0 \tag{2"}$$

In the zoom lens according to the embodiment of the present disclosure, it is preferable that the first lens group GR1 is configured by a negative meniscus lens that has a convex surface facing the object side and a positive meniscus lens that has a convex surface facing the object side, in order from the object side. By employing such a configuration, the entire lens length can be configured to be compact while the distortion aberration, the coma aberration, and the chromatic aberration of magnification are corrected favorably.

In addition, it is preferable that the zoom lens according to the embodiment of the present disclosure is configured so as to satisfy the following Conditional Equations (3) and (4).

$$nd3 < 1.75 \tag{3}$$

$$vd3 > 40 \tag{4}$$

Here, nd3 is a refractive index of the medium of the negative lens L6 of the third lens group for the D line (wavelength 587.6 nm), and vd3 is the Abbe number of the medium of the negative lens L6 of the third lens group for the D line (wavelength 587.6 nm).

These Conditional Equations (3) and (4) define the refractive index and the Abbe number of the medium of the negative lens L6 of the third lens group for the D line. In a case where the refractive index is above the range represented in Conditional Equation (3), since the specific gravity of the medium is high, the weight of the lens is high, and accordingly, the size of the actuator that drives the focusing group is increased, whereby the size of the lens barrel is increased. On the other hand, in a case where the refractive index is below the range represented in Conditional Equation (4), when focusing is performed, variations in the axial chromatic aberration and the chromatic aberration of magnification increase.

In addition, it is preferable that the zoom lens according to the embodiment of the present disclosure satisfies the following Conditional Equation (5).

$$0.5 < f2/fw < 1.2 \tag{5}$$

Here, f2 is the focal length of the second lens group GR2. This Conditional Equation (5) defines the focal length of the second lens group GR2 with respect to the focal length of the whole zoom lens system at infinity focusing in the wide angle end state. In a case where the ratio is below the range represented in Conditional Equation (5), since the power of the second lens group GR2 is too high, the eccentricity sensitivity of the lens is high, and accordingly, the manufacturing difficulty increases. On the other hand, in a case where the ratio is above the range represented in Conditional Equation (5), when the power is changed from the wide angle end to the telephoto end, the moving distance of the second lens group GR2 is long, which is disadvantageous for the miniaturization.

In addition, in the range represented in Conditional Equation (5), it is preferable to satisfy the following Conditional Equation (5').

$$0.6 < f2/fw < 1.0 \tag{5'}$$

Furthermore, in the range represented in Conditional Equation (5), it is more preferable to satisfy the following Conditional Equation (5"). In such a case, the entire lens length can be decreased further while the eccentricity sensitivity is suppressed.

$$0.7 < f2/fw < 0.9 \tag{5"}$$

In addition, in the zoom lens according to the embodiment of the present disclosure, it is preferable to configure the fourth lens group GR4 by using one positive lens. By configuring the fourth lens group GR4 by using one lens, the cost of the raw material can be reduced.

Furthermore, in the zoom lens according to the embodiment of the present disclosure, it is preferable the second lens group GR2 is configured by a positive lens, a negative lens, and a positive lens in order from the object side. By employing such a configuration, the spherical aberration, the astigmatism, and the chromatic aberration can be corrected favorably by using a small number of lenses.

In addition, in the zoom lens according to the embodiment of the present disclosure, it is preferable that the second lens group GR2 is configured by a positive lens, a positive lens, and a negative lens in order from the object side. By employing such a configuration, the spherical aberration, the astigmatism, and the chromatic aberration can be corrected favorably by using a small number of lenses.

Hereinafter, exemplary embodiments (hereinafter, referred to as embodiments) according to the present disclosure will be described. The description will be presented in the following order.

1. First Embodiment (Numeric Value Example 1)
2. Second Embodiment (Numeric Value Example 2)
3. Third Embodiment (Numeric Value Example 3)
4. Fourth Embodiment (Numeric Value Example 4)
5. Application Example (Imaging Apparatus)

The meanings and the like of symbols shown in the tables and description presented below are as follows. A "surface number" represents an i-th surface counted from the object side, "Ri" represents the radius of curvature of the i-th surface, and "Di" represents an axial upper surface gap (the thickness of the center of the lens or an air gap) between the i-th surface counted from the object side and the (i+1)-th surface. In addition, "Ni" represents the refractive index of the material configuring the i-th lens for the D line (wavelength 587.6 nm), "vi" represents an Abbe number of the material configuring the i-th lens for the D line (wavelength 587.6 nm), "f" represents the focal length of the whole lens system, "Fno" represents the full aperture F number, and "ω" represents a half angle of view. Furthermore, "∞" indicates that the corresponding surface is a planar surface, and "ASP"

indicates that the corresponding surface is aspheric. In addition, the axial upper surface gap "Di" that is a variable gap is denoted as "variable".

In some of the zoom lenses used in the embodiments, the lens surface is configured by an aspheric surface. When a distance from the apex of the lens surface in the optical axis direction is "x", a height in a direction perpendicular to the optical axis is "y", paraxial curvature at the lens apex is "c", and a conic constant is "k", the distance x is defined such that $x = cy^2/(1+(1-(1+k)c^2y^2)^{1/2}) + A2y^2 + A4y^4 + A6y^6 + A8y^8 + A10y^{10}$. Here, A2, A4, A6, A8, and A10 are the second-order, fourth-order, sixth-order, eighth-order, and tenth-order aspheric coefficients.

1. First Embodiment

[Configuration of Lens]

FIG. 1 is a diagram illustrating the lens configuration of a zoom lens according to the first embodiment of the present disclosure. In the zoom lens according to the first embodiment, a first lens group GR1, a second lens group GR2, a third lens group GR3, and a fourth lens group GR4 are arranged in order from the object side with respect to an image surface IMG.

The first lens group GR1 is configured by a negative meniscus lens L1 that has a convex surface facing the object side and has a compound aspheric surface on the image side and a positive meniscus lens L2 that has a convex surface facing the object side in order from the object side. The meniscus lens has both surfaces that are formed by surfaces curved in the same direction, and the signs of the curvatures of both surfaces are the same.

The second lens group GR2 is configured by a biconvex lens L3 that has aspheric surfaces formed on both surfaces thereof, a negative meniscus lens L4 having a convex surface facing the object side, and a positive meniscus lens L5 having a concave surface facing the object side, in order from the object side. By moving the second lens group GR2 in a direction perpendicular to the optical axis, an image can be shifted.

The third lens group GR3 is configured by a negative meniscus lens L6 that has a concave surface facing the object side and an aspheric surface formed on the side located on the object side.

The fourth lens group GR4 is configured by a positive meniscus lens L7 that has a concave surface facing the object side.

In addition, a diaphragm S is arranged between the first lens group GR1 and the second lens group GR2, and a filter (not illustrated in the figure) is arranged between the fourth lens group GR4 and the image surface IMG.

[Specification of Zoom Lens]

Table 1 illustrates the lens data of Numeric Value Example 1 in which specific numeric values are applied to the zoom lens according to the first embodiment.

TABLE 1

| Surface No. | R | D | Nb | vd |
|---|---|---|---|---|
| 1 | 69.813 | 1.000 | 1.883 | 40.8047 |
| 2 | 13.862 | 0.100 | 1.517 | 49.9592 |
| 3 (ASP) | 12.769 | 4.004 | | |
| 4 | 16.570 | 1.611 | 1.92286 | 20.88 |
| 5 | 24.778 | D5 | | |
| 6 | infinite | 0.600 | | |
| 7 (ASP) | 9.981 | 2.390 | 1.61881 | 63.8544 |
| 8 (ASP) | −24.818 | 1.980 | | |
| 9 | 217.037 | 1.039 | 1.74077 | 27.76 |
| 10 | 9.893 | 2.279 | | |
| 11 | −47.693 | 1.938 | 1.63854 | 55.4487 |
| 12 | −10.545 | D12 | | |
| 13 (ASP) | −17.478 | 1.000 | 1.75501 | 51.1567 |
| 14 | −173.166 | D14 | | |
| 15 | −21723.800 | 1.853 | 1.7552 | 27.53 |
| 16 | −74.244 | 13.165 | | |

In the zoom lens according to the first embodiment, the third surface, the seventh surface, the eighth surface, and the thirteenth surface are configured in aspheric shapes as described above. Conic constants k and the fourth-order, sixth-order, eighth-order, and tenth-order aspheric coefficients A4, A6, A8, and A10 of each surface are represented in Table 2.

TABLE 2

| Surface No. | K | A4 | A6 | A8 | A10 |
|---|---|---|---|---|---|
| 3 | −0.79419 | 3.81845E−05 | 2.99418E−07 | −2.30212E−09 | 1.63655E−11 |
| 7 | 0.00000 | −9.79921E−05 | −5.69592E−07 | −1.25230E−08 | −4.32235E−10 |
| 8 | 0.00000 | 1.77946E−04 | −1.87836E−06 | 3.95850E−08 | −1.20856E−09 |
| 13 | 0.00000 | −3.32129E−05 | 4.01741E−07 | −1.21777E−08 | 2.32587E−10 |

In the first embodiment, when the lens position changes from the wide angle end to the telephoto end, the following gaps between lens groups change. The gaps between the lens groups include a gap D5 between the first lens group GR1 and the diaphragm, a gap D12 between the second lens group GR2 and the third lens group GR3, and a gap D14 between the third lens group GR3 and the fourth lens group GR4. The numeric values of the gaps D5, D12, and D14, the focal lengths f, the maximum apertures Fno, and the half angles ω at the wide angle end (f=18.54), at an intermediate focal length (f=26.99), and the telephoto end (f=34.91) are represented in Table 3.

TABLE 3

| Fno | 4.02 | 4.82 | 5.57 |
|---|---|---|---|
| f | 18.54 | 26.99 | 34.91 |
| ω | 40.11 | 27.78 | 21.77 |
| D5 | 16.948 | 7.167 | 2.200 |
| D12 | 4.073 | 4.275 | 4.503 |
| D14 | 3.020 | 8.677 | 13.783 |

[Aberration of Zoom Lens]

Figure 2:
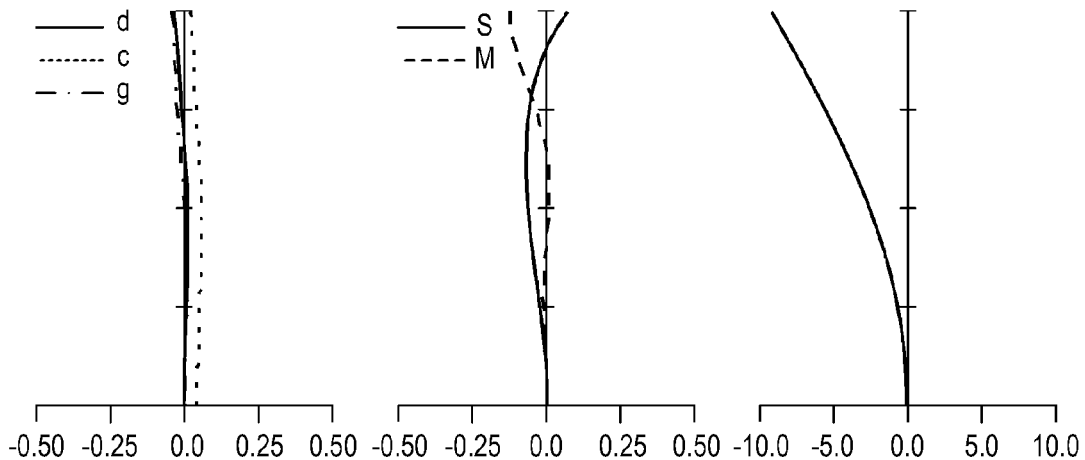
FIGS. 2A to 2C are diagrams illustrating aberrations of the zoom lens according to the first embodiment at a wide angle end.
Figure 3:
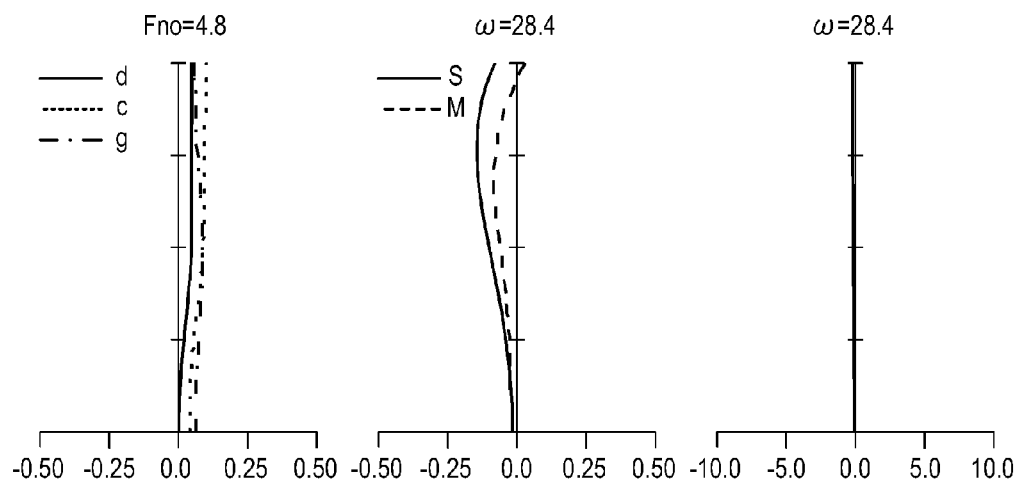
FIGS. 3A to 3C are diagrams illustrating aberrations of the zoom lens according to the first embodiment at an intermediate focal length between the wide angle end and a telephoto end.
Figure 4:
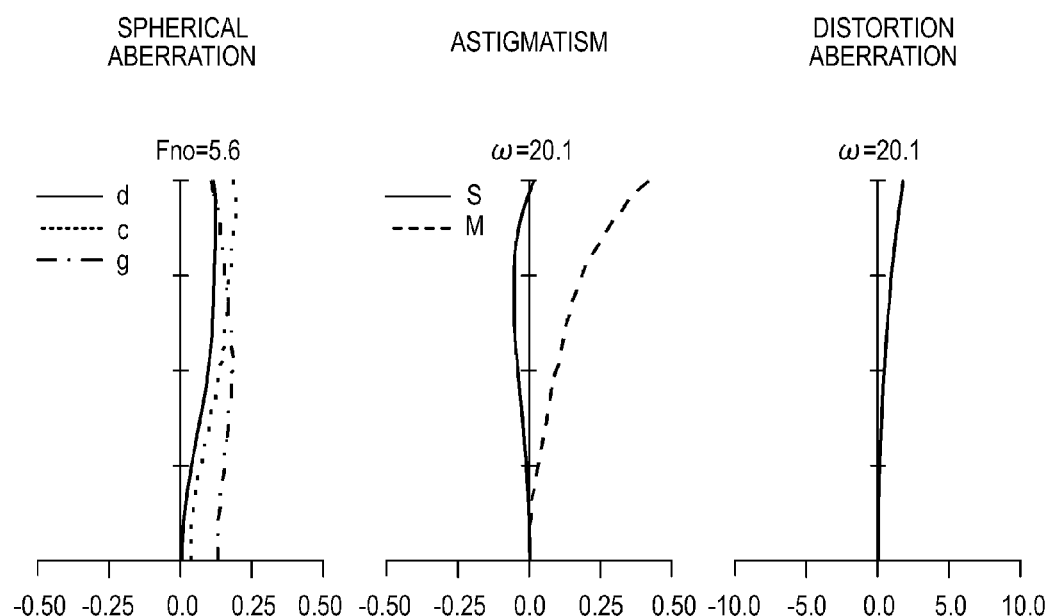
FIGS. 4A to 4C are diagrams illustrating aberrations of the zoom lens according to the first embodiment at the telephoto end.

FIGS. 2A to 4C are diagrams illustrating aberrations of the zoom lens according to the first embodiment. FIGS. 2A to 2C are diagrams illustrating aberrations of the zoom lens according to the first embodiment at a wide angle end. FIGS. 3A to 3C are diagrams illustrating aberrations of the zoom lens according to the first embodiment at an intermediate focal length between the wide angle end and a telephoto end. FIGS. 4A to 4C are diagrams illustrating aberrations of the zoom lens according to the first embodiment at the telephoto end. The diagrams denoted by being posted by A, B, and C are diagrams illustrating a spherical aberration, astigmatism, and a distortion aberration.

In addition, in the diagram illustrating the spherical aberration, a solid line, a dotted line, and a short-dashed line represent the values at the D line (587.6 nm), line C (wavelength 656.3 nm), and line G (wavelength 435.8 nm). In addition, in the diagram illustrating the astigmatism, a solid line S represents the value on a sagittal image surface, and a dotted line M represents the value on a meridional image surface.

2. Second Embodiment

[Configuration of Zoom Lens]

Figure 5:
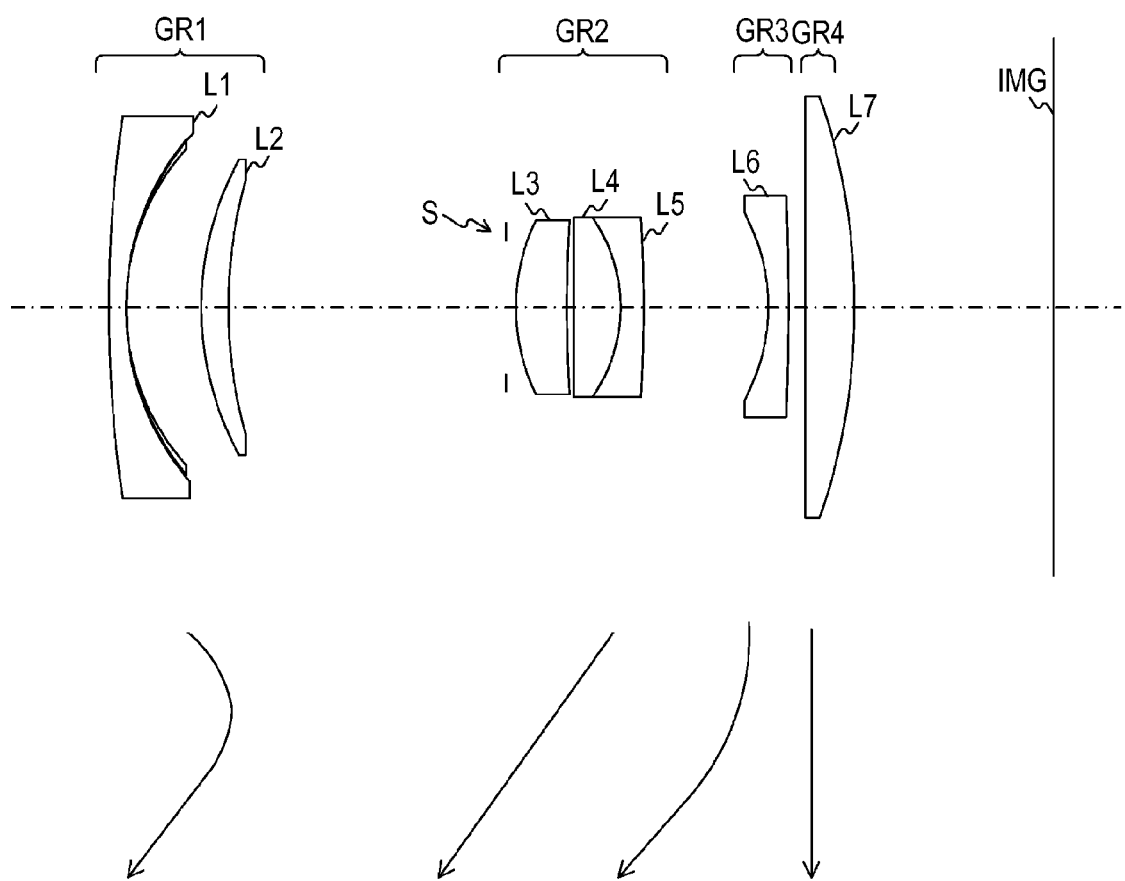
FIG. 5 is a diagram illustrating the lens configuration of a zoom lens according to a second embodiment.

FIG. 5 is a diagram illustrating the lens configuration of a zoom lens according to a second embodiment of the present disclosure. In the zoom lens according to the second embodiment, a first lens group GR1, a second lens group GR2, a third lens group GR3, and a fourth lens group GR4 are arranged in order from the object side with respect to an image surface IMG.

The first lens group GR1 is configured by a negative meniscus lens L1 that has a convex surface facing the object side and has a compound aspheric surface on the image side and a positive meniscus lens L2 that has a convex surface facing the object side in order from the object side.

In the second lens group GR2, a cemented lens is arranged which is configured by a positive meniscus lens L3 having a convex surface facing the object side and having aspheric surfaces formed on both faces, a positive meniscus lens L4 having a concave surface facing the object side, and a negative meniscus lens L5 having a concave surface facing the object side, in order from the object side. By moving the second lens group GR2 in a direction perpendicular to the optical axis, an image can be shifted.

The third lens group GR3 is configured by a negative meniscus lens L6 that has a concave surface facing the object side and an aspheric surface formed on the side located on the object side.

The fourth lens group GR4 is configured by a positive meniscus lens L7 that has a concave surface facing the object side.

In addition, a diaphragm S is arranged between the first lens group GR1 and the second lens group GR2, and a filter (not illustrated in the figure) is arranged between the fourth lens group GR4 and the image surface IMG.

[Specification of Zoom Lens]

Table 4 illustrates the lens data of Numeric Value Example 2 in which specific numeric values are applied to the zoom lens according to the second embodiment.

TABLE 4

| Surface No. | R | D | N | ν |
|---|---|---|---|---|
| 1 | 76.607 | 1.000 | 1.883 | 40.8047 |
| 2 | 15.545 | 0.100 | 1.517 | 49.9592 |
| 3 (ASP) | 14.244 | 4.497 | | |
| 4 | 20.035 | 1.517 | 1.92286 | 20.88 |
| 5 | 30.793 | D5 | | |
| 6 | infinite | 0.600 | | |
| 7 (ASP) | 10.928 | 3.000 | 1.61881 | 63.8544 |
| 8 (ASP) | 104.292 | 0.500 | | |
| 9 | −118.496 | 2.800 | 1.83481 | 42.72 |
| 10 | −8.923 | 1.400 | 1.74077 | 27.76 |
| 11 | −55.095 | D11 | | |
| 12 (ASP) | −13.500 | 1.200 | 1.744 | 44.7192 |
| 13 | −173.166 | D13 | | |
| 14 | −21723.800 | 3.000 | 1.7433 | 49.2208 |
| 15 | −36.816 | 12.500 | | |

In the zoom lens according to the second embodiment, the third surface, the seventh surface, the eighth surface, and the twelfth surface are configured in aspheric shapes as described above. Conic constants k and the fourth-order, sixth-order, eighth-order, and tenth-order aspheric coefficients A4, A6, A8, and A10 of each surface are represented in Table 5.

TABLE 5

| Surface No. | K | A4 | A6 | A8 | A10 |
|---|---|---|---|---|---|
| 3 | −0.79419 | 2.68223E−05 | 2.16021E−07 | −1.50337E−09 | 9.60158E−12 |
| 7 | 0.00000 | −1.71698E−05 | −5.56617E−07 | −1.57147E−09 | 1.09108E−10 |
| 8 | 0.00000 | 8.64552E−05 | −1.24727E−06 | 7.75912E−08 | −1.70809E−9 |
| 12 | 0.00000 | −2.46673E−04 | −3.20591E−06 | −4.83094E−09 | −2.21635E−09 |

In the second embodiment, when the lens position changes from the wide angle end to the telephoto end, the following gaps between lens groups change. The gaps between the lens groups include a gap D5 between the first lens group GR1 and the diaphragm, a gap D11 between the second lens group GR2 and the third lens group GR3, and a gap D13 between the third lens group GR3 and the fourth lens group GR4. The numeric values of the gaps D5, D11, and D13, the focal lengths f, the maximum apertures Fno, and the half angles ω at the wide angle end (f=18.52), at an intermediate focal length (f=24.97), and the telephoto end (f=34.90) are represented in Table 6.

TABLE 6

| Fno | 4.09 | 4.86 | 6.01 |
|---|---|---|---|
| f | 18.52 | 24.97 | 34.90 |
| ω | 38.84 | 29.11 | 21.36 |
| D5 | 16.539 | 8.792 | 2.200 |
| D11 | 7.367 | 7.482 | 7.747 |
| D13 | 0.979 | 5.698 | 12.483 |

[Aberration of Zoom Lens]

Figure 6:
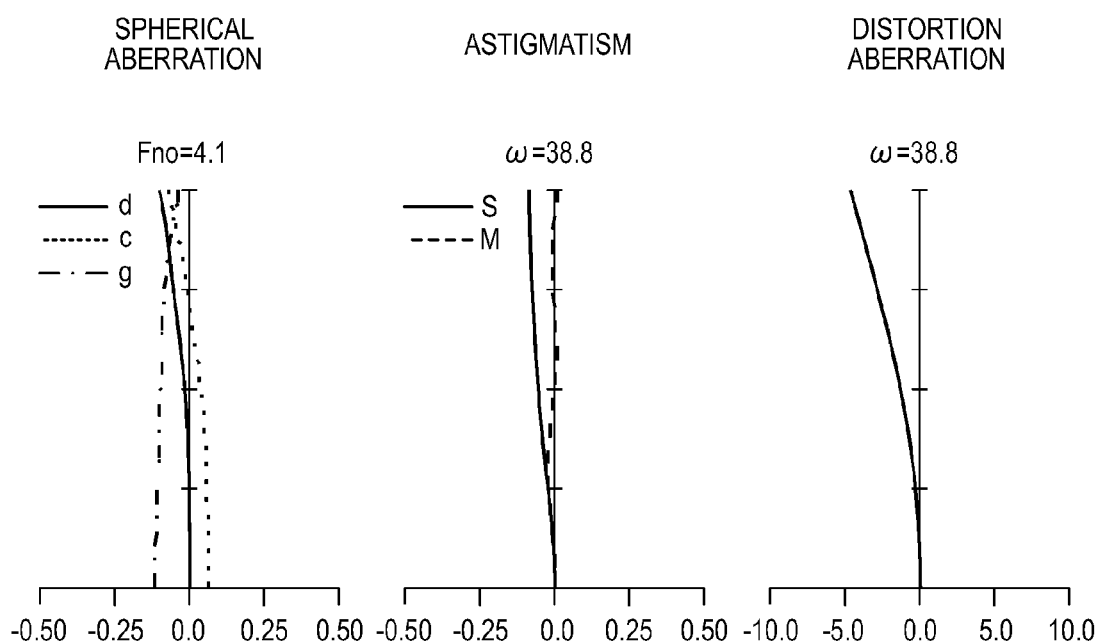
FIGS. 6A to 6C are diagrams illustrating aberrations of the zoom lens according to the second embodiment at the wide angle end.
Figure 7:
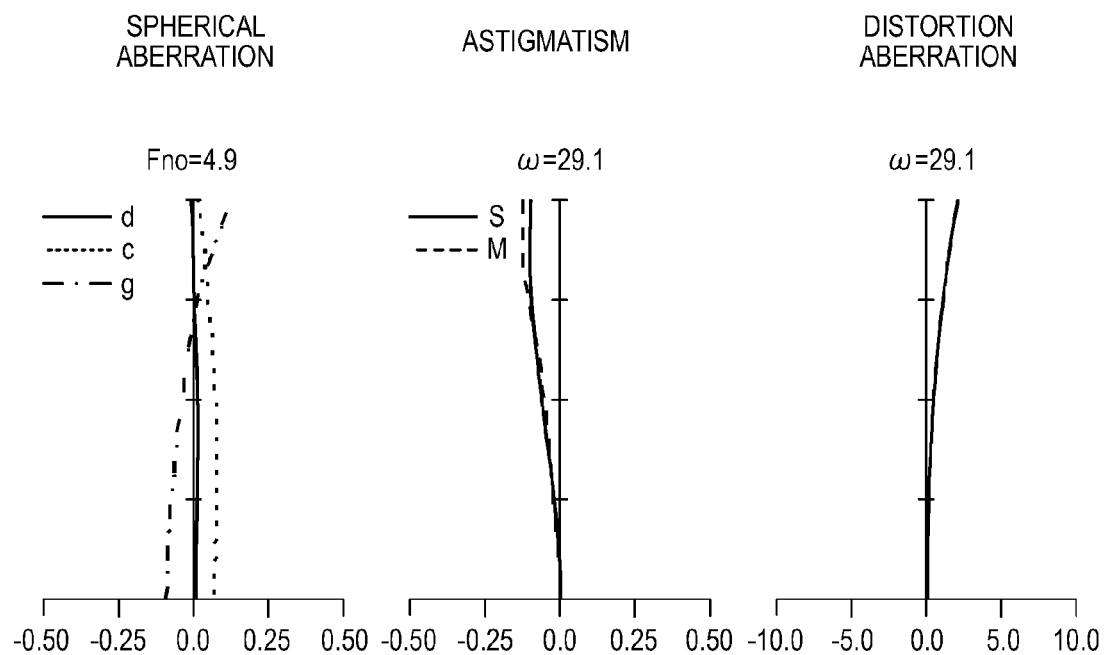
FIGS. 7A to 7C are diagrams illustrating aberrations of the zoom lens according to the second embodiment at an intermediate focal length between the wide angle end and the telephoto end.
Figure 8:
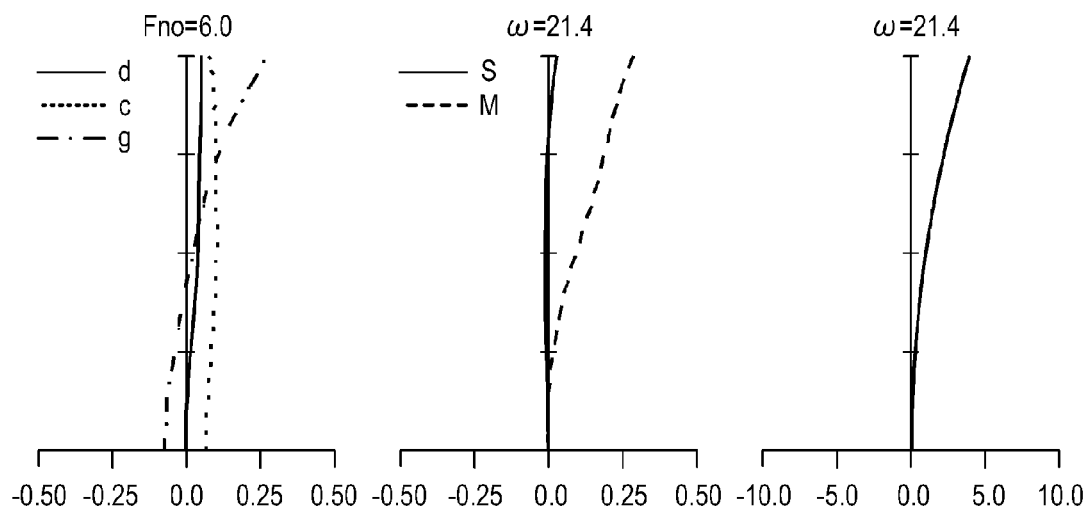
FIGS. 8A to 8C are diagrams illustrating aberrations of the zoom lens according to the second embodiment at the telephoto end.

FIGS. 6A to 8C are diagrams illustrating aberrations of the zoom lens according to the second embodiment. FIGS. 6A to 6C are diagrams illustrating aberrations of the zoom lens according to the second embodiment at the wide angle end. FIGS. 7A to 7C are diagrams illustrating aberrations of the zoom lens according to the second embodiment at an intermediate focal length between the wide angle end and the telephoto end. FIGS. 8A to 8C are diagrams illustrating aberrations of the zoom lens according to the second embodiment at the telephoto end. The diagrams denoted by being posted by A, B, and C illustrate a spherical aberration, astigmatism, and a distortion aberration. In addition, the types of lines shown in the diagrams illustrating the aberrations are similar to those described in the first embodiment.

3. Third Embodiment

[Configuration of Zoom Lens]

Figure 9:
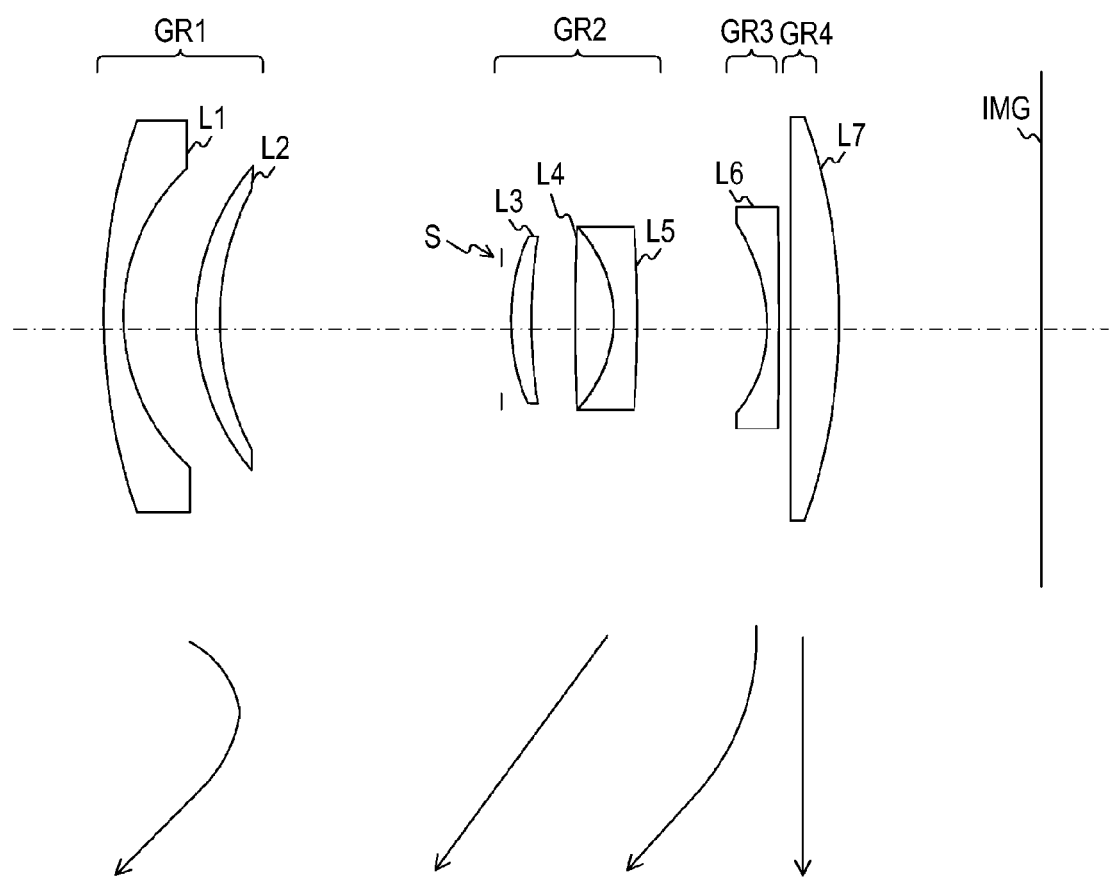
FIG. 9 is a diagram illustrating the lens configuration of a zoom lens according to a third embodiment.

FIG. 9 is a diagram illustrating the lens configuration of a zoom lens according to a third embodiment of the present disclosure. In the zoom lens according to the third embodiment, a first lens group GR1, a second lens group GR2, a third lens group GR3, and a fourth lens group GR4 are arranged in order from the object side with respect to an image surface IMG.

The first lens group GR1 is configured by a negative meniscus lens L1 that has a convex surface facing the object side and has aspheric surfaces on both faces and a positive meniscus lens L2 that has a convex surface facing the object side.

In the second lens group GR2, a cemented lens is arranged which is configured by a positive meniscus lens L3 having a convex surface facing the object side, a biconvex lens L4, and a negative meniscus lens L5 having a concave surface facing the object side, in order from the object side. By moving the second lens group GR2 in a direction perpendicular to the optical axis, an image can be shifted.

The third lens group GR3 is configured by a negative meniscus lens L6 that has a concave surface facing the object side and an aspheric surface formed on the side located on the object side.

The fourth lens group GR4 is configured by a positive meniscus lens L7 that has a concave surface facing the object side.

In addition, a diaphragm S is arranged between the first lens group GR1 and the second lens group GR2, and a filter (not illustrated in the figure) is arranged between the fourth lens group GR4 and the image surface IMG.

[Specification of Zoom Lens]

Table 7 illustrates the lens data of Numeric Value Example 3 in which specific numeric values are applied to the zoom lens according to the third embodiment.

TABLE 7

| Surface No. | R | D | N | ν |
|---|---|---|---|---|
| 1 (ASP) | 36.716 | 1.000 | 1.85135 | 40.1038 |
| 2 (ASP) | 12.500 | 4.445 | | |
| 3 | 15.178 | 1.413 | 2.0027 | 19.3166 |
| 4 | 18.853 | D4 | | |
| 5 | infinite | 0.600 | | |
| 6 (ASP) | 11.893 | 1.262 | 1.61881 | 63.8544 |
| 7 (ASP) | 37.196 | 2.687 | | |
| 8 | 75.299 | 2.420 | 1.83481 | 42.72 |

TABLE 7-continued

| Surface No. | R | D | N | ν |
|---|---|---|---|---|
| 9 | −8.298 | 1.400 | 1.7552 | 27.53 |
| 10 | −65.980 | D10 | | |
| 11 (ASP) | −13.500 | 0.700 | 1.6968 | 55.4588 |
| 12 | −173.166 | D12 | | |
| 13 | −21723.800 | 3.000 | 1.7433 | 49.2208 |
| 14 | −36.836 | 12.500 | | |

In the zoom lens according to the third embodiment, the first surface, the second surface, the sixth surface, the seventh surface, and the eleventh surface are configured in aspheric shapes as described above. Conic constants k and the fourth-order, sixth-order, eighth-order, and tenth-order aspheric coefficients A4, A6, A8, and A10 of each surface are represented in Table 8.

TABLE 8

| Surface No. | K | A4 | A6 | A8 | A10 |
|---|---|---|---|---|---|
| 1 | 0.00000 | −3.48453E−05 | 3.61208E−07 | −1.84060E−09 | 3.38051E−12 |
| 2 | −0.79419 | 5.91181E−06 | 4.57702E−07 | 4.80698E−10 | −6.12636E−12 |
| 6 | 0.00000 | 7.73077E−06 | −6.05649E−06 | 3.39452E−07 | −9.58423E−09 |
| 7 | 0.00000 | 9.41928E−05 | −7.03857E−06 | 4.56416E−07 | −1.27780E−08 |
| 11 | 0.00000 | −2.13388E−04 | −1.70146E−06 | −2.08982E−08 | −8.01664E−10 |

In the third embodiment, when the lens position changes from the wide angle end to the telephoto end, the following gaps between lens groups change. The gaps between the lens groups include a gap D4 between the first lens group GR1 and the diaphragm, a gap D10 between the second lens group GR2 and the third lens group GR3, and a gap D12 between the third lens group GR3 and the fourth lens group GR4. The numeric values of the gaps D4, D10, and D12, the focal lengths f, the maximum apertures Fno, and the half angles ω at the wide angle end (f=18.53), at an intermediate focal length (f=24.98), and the telephoto end (f=34.90) are represented in Table 9.

TABLE 9

| Fno | 4.09 | 4.76 | 5.78 |
|---|---|---|---|
| f | 18.53 | 24.98 | 34.90 |
| ω | 38.68 | 29.09 | 21.36 |
| D4 | 17.007 | 8.911 | 2.200 |
| D10 | 7.782 | 7.942 | 8.188 |
| D12 | 0.785 | 5.278 | 12.007 |

[Aberration of Zoom Lens]

Figures 12A, 12B, 12C:
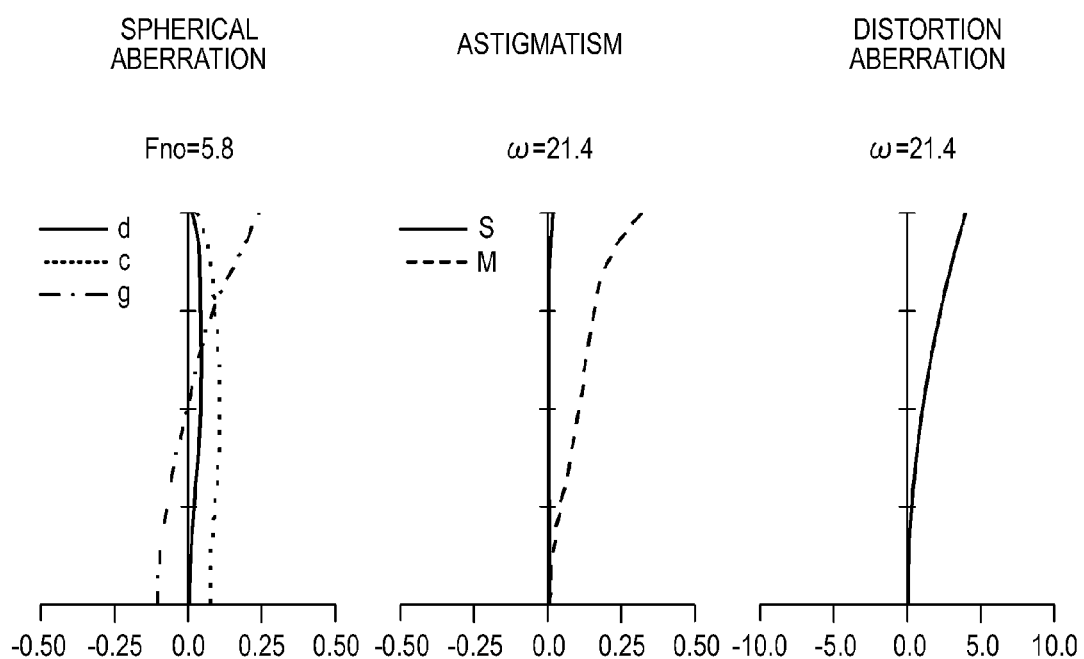
FIGS. 12A to 12C are diagrams illustrating aberrations of the zoom lens according to the third embodiment at the telephoto end.

FIGS. 10A to 12C are diagrams illustrating aberrations of the zoom lens according to the third embodiment. FIGS. 10A to 10C are diagrams illustrating aberrations of the zoom lens according to the third embodiment at the wide angle end. FIGS. 11A to 11C are diagrams illustrating aberrations of the zoom lens according to the third embodiment at an intermediate focal length between the wide angle end and the telephoto end. FIGS. 12A to 12C are diagrams illustrating aberrations of the zoom lens according to the third embodiment at the telephoto end. The diagrams denoted by being posted by A, B, and C illustrate a spherical aberration, astigmatism, and a distortion aberration. In addition, the types of lines shown in the diagrams illustrating the aberrations are similar to those described in the first embodiment.

4. Fourth Embodiment

[Configuration of Zoom Lens]

Figure 13:
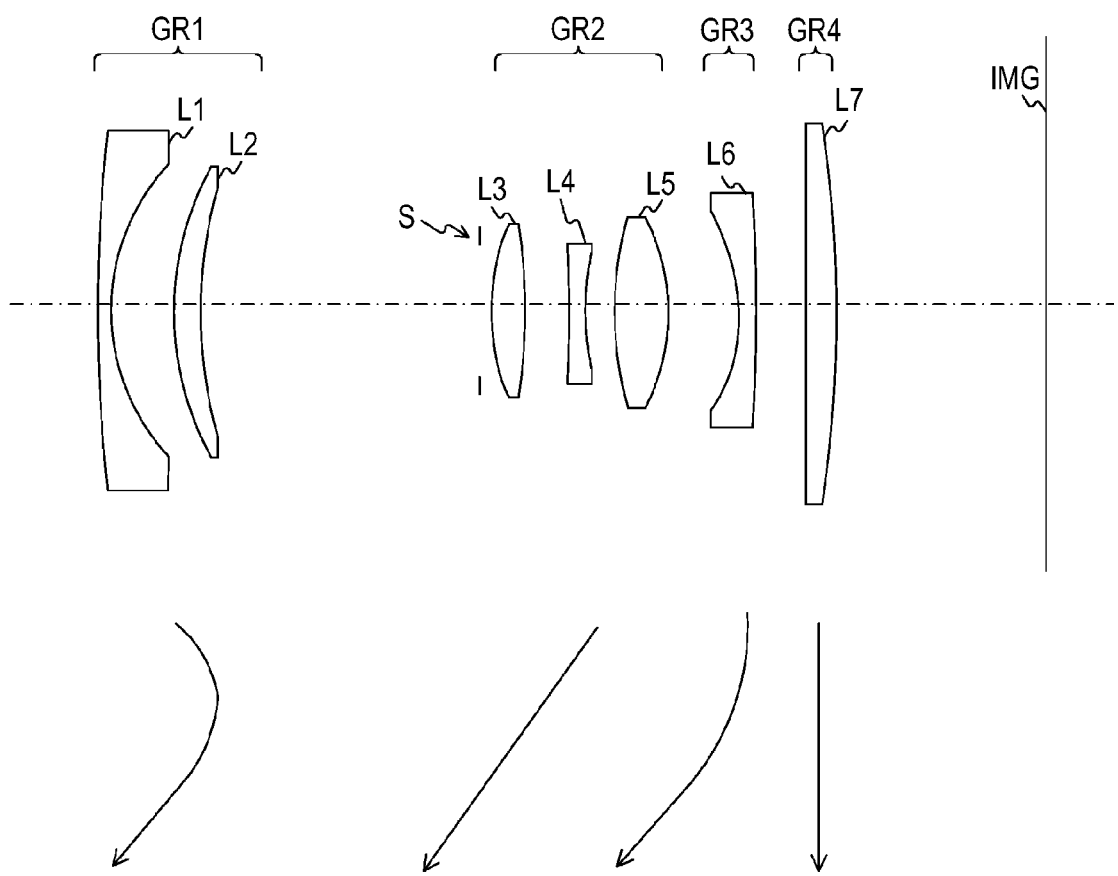
FIG. 13 is a diagram illustrating the lens configuration of a zoom lens according to a fourth embodiment.

FIG. 13 is a diagram illustrating the lens configuration of a zoom lens according to a fourth embodiment of the present disclosure. In the zoom lens according to the fourth embodiment, a first lens group GR1, a second lens group GR2, a third lens group GR3, and a fourth lens group GR4 are arranged in order from the object side with respect to an image surface IMG.

The first lens group GR1 is configured by a negative meniscus lens L1 that has a convex surface facing the object side and has aspheric surfaces on both faces and a positive meniscus lens L2 that has a convex surface facing the object side.

The second lens group GR2 is configured by a biconvex lens L3 that has aspheric surfaces formed on both surfaces thereof, a biconcave lens L4, and a biconvex lens L5, in order from the object side. By moving the second lens group GR2 in a direction perpendicular to the optical axis, an image can be shifted.

The third lens group GR3 is configured by a negative meniscus lens L6 that has a concave surface facing the object side and an aspheric surface formed on the side located on the object side.

The fourth lens group GR4 is configured by a positive meniscus lens L7 that has a concave surface facing the object side.

In addition, a diaphragm S is arranged between the first lens group GR1 and the second lens group GR2, and a filter (not illustrated in the figure) is arranged between the fourth lens group GR4 and the image surface IMG.

[Specification of Zoom Lens]

Table 10 illustrates the lens data of Numeric Value Example 4 in which specific numeric values are applied to the zoom lens according to the fourth embodiment.

TABLE 10

| Surface No. | R | D | N | ν |
|---|---|---|---|---|
| 1 (ASP) | 71.658 | 1.000 | 1.85135 | 40.1038 |
| 2 (ASP) | 12.581 | 3.647 | | |
| 3 | 17.019 | 1.713 | 1.92286 | 20.88 |
| 4 | 27.240 | D4 | | |
| 5 | infinite | 0.600 | | |
| 6 (ASP) | 11.190 | 2.026 | 1.61881 | 63.8544 |
| 7 (ASP) | −41.284 | 2.872 | | |
| 8 | −40.853 | 0.800 | 1.74077 | 27.76 |
| 9 | 14.437 | 1.863 | | |
| 10 | 22.414 | 3.136 | 1.63854 | 55.4487 |
| 11 | −13.414 | D11 | | |
| 12 (ASP) | −12.700 | 1.000 | 1.7433 | 49.2208 |
| 13 | −173.166 | D13 | | |
| 14 | −21723.800 | 1.863 | 1.80518 | 25.4559 |
| 15 | −75.773 | 12.500 | | |

In the zoom lens according to the fourth embodiment, the first surface, the second surface, the sixth surface, the seventh surface, and the twelfth surface are configured in aspheric shapes as described above. Conic constants k and the fourth-order, sixth-order, eighth-order, and tenth-order aspheric coefficients A4, A6, A8, and A10 of each surface are represented in Table 11.

TABLE 11

| Surface No. | K | A4 | A6 | A8 | A10 |
|---|---|---|---|---|---|
| 1 | 0.00000 | −6.32893E−06 | −2.24458E−08 | 1.93285E−10 | −3.44752E−13 |
| 2 | −0.79419 | 3.30162E−05 | 7.76097E−08 | −2.39035E−10 | 5.45533E−12 |
| 6 | 0.00000 | −4.90289E−05 | −2.12834E−06 | 1.14436E−07 | −2.834410E−09 |
| 7 | 0.00000 | 7.50664E−05 | −2.41299E−06 | 1.64349E−07 | −4.00687E−09 |
| 12 | 0.00000 | −1.33040E−04 | −9.95477E−07 | −1.21652E−08 | −1.47053E−10 |

In the fourth embodiment, when the lens position changes from the wide angle end to the telephoto end, the following gaps between lens groups change. The gaps between the lens groups include a gap D4 between the first lens group GR1 and the diaphragm, a gap D11 between the second lens group GR2 and the third lens group GR3, and a gap D13 between the third lens group GR3 and the fourth lens group GR4. The numeric values of the gaps D4, D11, and D13, the focal lengths f, the maximum apertures Fno, and the half angles ω at the wide angle end (f=18.54), at an intermediate focal length (f=26.99), and the telephoto end (f=34.92) are represented in Table 12.

TABLE 12

| Fno | 4.06 | 4.88 | 5.65 |
|---|---|---|---|
| f | 18.54 | 26.99 | 34.92 |
| ω | 40.13 | 27.77 | 21.77 |
| D4 | 16.676 | 7.013 | 2.200 |
| D11 | 4.332 | 4.428 | 4.501 |
| D13 | 2.972 | 8.663 | 14.019 |

[Aberration of Zoom Lens]

Figure 14:
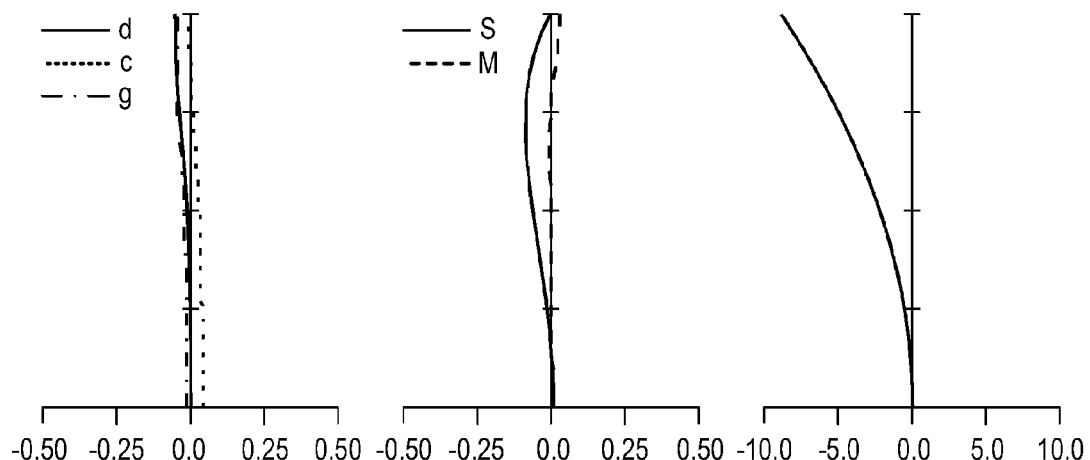
FIGS. 14A to 14C are diagrams illustrating aberrations of the zoom lens according to the fourth embodiment at the wide angle end.
Figure 15:
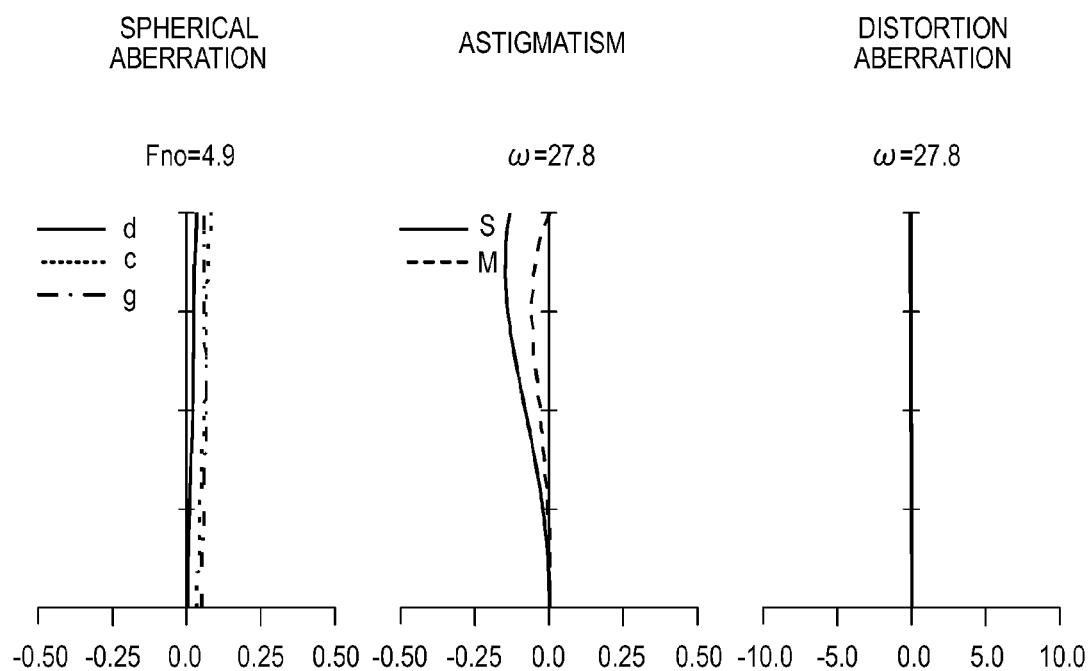
FIGS. 15A to 15C are diagrams illustrating aberrations of the zoom lens according to the fourth embodiment at an intermediate focal length between the wide angle end and the telephoto end.
Figure 16:
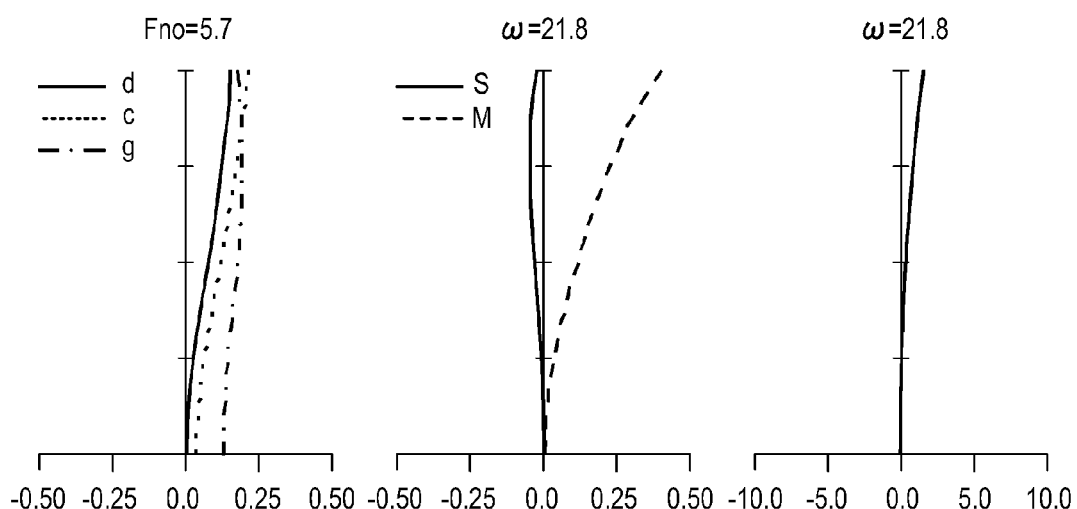
FIGS. 16A to 16C are diagrams illustrating aberrations of the zoom lens according to the fourth embodiment at the telephoto end.

FIGS. 14A to 16C are diagrams illustrating aberrations of the zoom lens according to the fourth embodiment. FIGS. 14A to 14C are diagrams illustrating aberrations of the zoom lens according to the fourth embodiment at the wide angle end. FIGS. 15A to 15C are diagrams illustrating aberrations of the zoom lens according to the fourth embodiment at an intermediate focal length between the wide angle end and the telephoto end. FIGS. 16A to 16C are diagrams illustrating aberrations of the zoom lens according to the fourth embodiment at the telephoto end. The diagrams denoted by being posted by A, B, and C illustrate a spherical aberration, astigmatism, and a distortion aberration. In addition, the types of lines shown in the diagrams illustrating the aberrations are similar to those described in the first embodiment.

[Conclusion of Conditional Equations]

Table 13 represents the values in Numeric Value Examples 1 to 4 according to the first to fourth embodiments. As is apparent from these values, Conditional Equations (1) to (5) are satisfied. In addition, as shown in the diagrams illustrating the aberrations, it can be understood that various types of aberrations are corrected with a good balance at the wide angle end, the intermediate focal length position between the wide angle end and the telephoto end, and the telephoto end.

TABLE 13

| | Example 1 | Example 2 | Example 3 | Example 4 |
|---|---|---|---|---|
| f3 | −25.819 | −19.743 | −21.050 | −18.487 |
| f4 | 98.644 | 49.612 | 49.639 | 94.432 |
| fw | 18.540 | 18.525 | 18.526 | 18.542 |
| Conditional Equation (1) | −1.393 | −1.066 | −1.136 | −0.997 |
| Conditional Equation (2) | 5.320 | 2.678 | 2.679 | 5.093 |
| Conditional Equation (3) | 1.755 | 1.744 | 1.697 | 1.743 |
| Conditional Equation (4) | 51.157 | 44.719 | 55.459 | 49.221 |
| Conditional Equation (5) | 0.866 | 0.846 | 0.870 | 0.803 |

5. Application Example

[Configuration of Imaging Apparatus]

Figure 17:
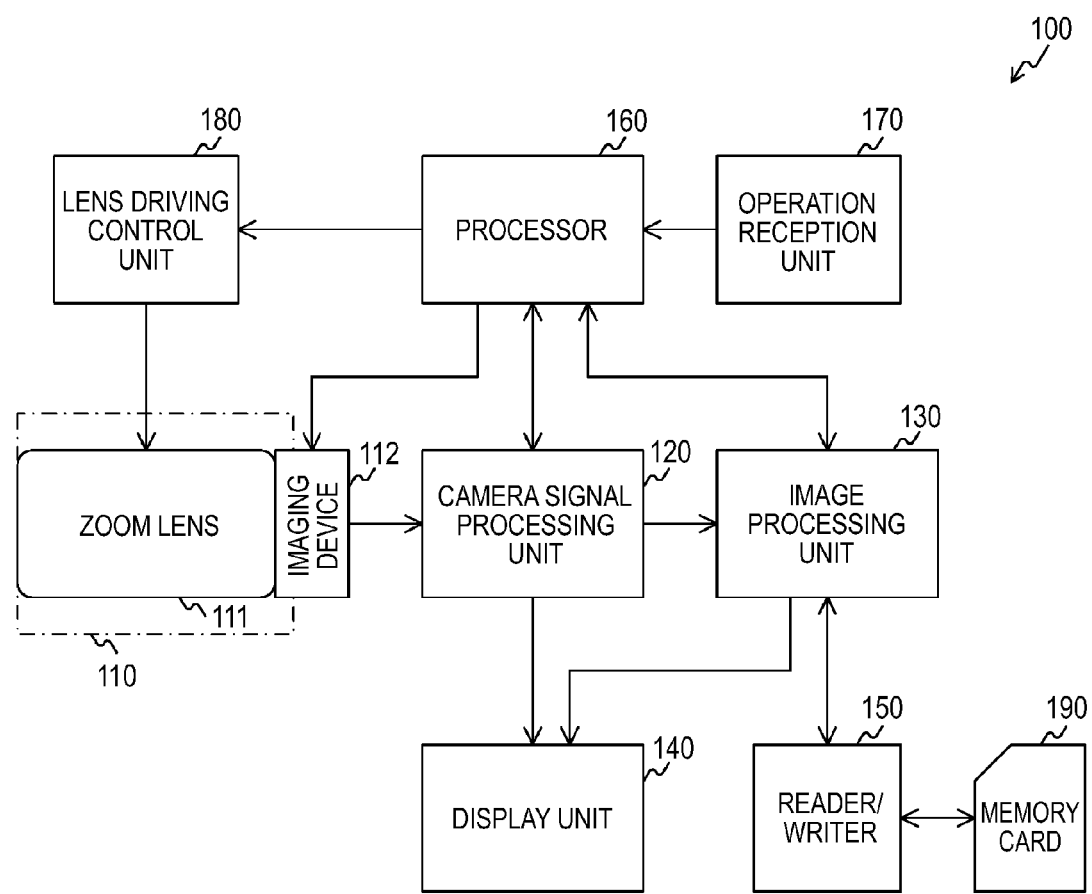
FIG. 17 is a diagram illustrating an example in which the zoom lens according to any one of the first to fourth embodiments is applied to an imaging apparatus.

FIG. 17 is a diagram illustrating an example in which the zoom lens according to any one of the first to fourth embodiments is applied to an imaging apparatus 100. The imaging apparatus 100 includes: a camera block 110; a camera signal processing unit 120; an image processing unit 130; a display unit 140; a reader/writer 150, a processor 160; an operation reception unit 170; and a lens driving control unit 180.

The camera block 110 is responsible for an imaging function and includes the zoom lens 111 according to any one of the first to fourth embodiments and an imaging device 112 that converts an optical image formed by the zoom lens 111 into an electrical signal. As the imaging device 112, for example, a photoelectric conversion device such as a CCD (Charge Coupled Device) or a CMOS (Complementary Metal-Oxide Semiconductor) may be used. As the zoom lens 111, here, the lens group according to any one of the first to fourth embodiments is illustrated so as to be simplified as a single lens.

The camera signal processing unit 120 performs signal processing such as analog-to-digital conversion of a photographed image signal. This camera signal processing unit 120 converts an output signal of the imaging device 112 into a digital signal. In addition, the camera signal processing unit 120 performs various types of signal processing such as noise removal, image quality correction, and conversion into luminance/color difference signal.

The image processing unit 130 performs a recording process or a reproducing process of an image signal. This image processing unit 130 performs a compressing/encoding process or an expanding/decoding process of an image signal that is based on a predetermined image data format, a conversion process of a data specification such as resolution, and the like.

The display unit 140 displays a photographed image or the like. This display unit 140 has a function of displaying the operation state of the operation reception unit 170 and various types of data such as a photographed image. The display unit 140, for example, may be configured by a liquid crystal display (LCD).

The reader/writer 150 accesses a memory card 190 for recording or reading out an image signal. This reader/writer 150 writes image data encoded by the image processing unit 130 into the memory card 190 or reads out the image data recorded in the memory card 190. The memory card 190, for example, is a semiconductor memory that can be detachably attached to a slot connected to the reader/writer 150.

The processor 160 controls the overall operation of the imaging apparatus. This processor 160 serves as a control processing unit that controls each circuit block installed to the imaging apparatus 100 and controls each circuit block based on an operation instruction signal or the like transmitted from the operation reception unit 170.

The operation reception unit 170 accepts an operation from a user. This operation reception unit 170, for example, may be realized by a shutter release button used for operating a shutter operation, a selection switch used for selecting an operating mode, and the like. The operation instruction signal received by the operation reception unit 170 is supplied to the processor 160.

The lens driving control unit 180 controls the driving of the lenses arranged in the camera block 110. This lens driving control unit 180 controls a motor (not illustrated in the figure) used for driving each lens of the zoom lens 111 and the like based on a control signal transmitted from the processor 160.

In the imaging apparatus 100, in a photographing standby state, under the control of the processor 160, an image signal photographed by the camera block 110 is output to the display unit 140 through the camera signal processing unit 120 and is displayed as a camera through image. In addition, when an operation instruction signal used for zooming is received by the operation reception unit 170, the processor 160 outputs a control signal to the lens driving control unit 180, and a predetermined lens of the zoom lens 111 is moved based on the control of the lens driving control unit 180.

When a shutter operation is received by the operation reception unit 170, a signal of a photographed image is output from the camera signal processing unit 120 to the image processing unit 130 and is converted into digital data of a predetermined data format by performing a compression/encoding process of the image signal. The converted data is output to the reader/writer 150 and written into the memory card 190.

The focusing is performed, for example, in a case where the shutter release button is half pressed or fully pressed for recording (photographing) in the operation reception unit 170 or the like. In such a case, the lens driving control unit 180 moves a predetermined lens of the zoom lens 111 based on the control signal transmitted from the processor 160.

In a case where the image data recorded into the memory card 190 is reproduced, predetermined image data is read out from the memory card 190 by the reader/writer 150 in accordance with an operation received by the operation reception unit 170. Then, after an expanding/decoding process is performed for the image data by the image processing unit 130, a reproduction image signal is output to the display unit 140 and a reproduction image is displayed.

Although an example is illustrated in the above-described embodiment in which the imaging apparatus 100 is assumed to be a digital still camera, the imaging apparatus 100 is not limited to the digital still camera and can be broadly applied as a digital input/output apparatus such as a digital video camera.

As above, according to the embodiment of the present disclosure, by decreasing the weight of the third lens group GR3 by using one negative lens, the third lens group GR3 can be moved at high speed by a small-size actuator.

In addition, since the above-described embodiment illustrates an example for realizing the technique disclosed here, each item described in the embodiment and an item specifying the present disclosure in the appended claims have a correspondence relationship. Similarly, the item specifying the present disclosure in the appended claims and an item to which the same name is assigned in the embodiment of the present disclosure have the following correspondence relationship. However, the present disclosure is not limited to the embodiments of the present disclosure and may be realized by applying various modifications to the embodiments in the scope not departing from the concept thereof.

Furthermore, an embodiment according to the present disclosure may have the following configurations.

(1) A zoom lens including: a first lens group that has negative refractive power; a diaphragm; a second lens group that has positive refractive power; a third lens group that has negative refractive power; and a fourth lens group that has positive refractive power, which are arranged in order from an object side, wherein the first lens group is configured by at least one negative lens and one positive lens, wherein the third lens group is configured by one negative lens, wherein, when power is changed from a wide angle end state to a telephoto end state, the first lens group, the second lens group, and the third lens group are moved in the direction of an optical axis, and the fourth lens group is fixed, and wherein, when focusing is performed, the third lens group is moved in the direction of the optical axis so as to satisfy the following Conditional Equations (1) and (2).

$$-2.8 < f3/fw < -0.5 \quad (1)$$

$$2.0 < f4/fw < 15.0 \quad (2)$$

Here, f3 is a focal length of the third lens group, f4 is a focal length of the fourth lens group, and fw is a focal length of the whole zoom lens system at infinite focusing in the wide angle end state.

(2) The zoom lens described in (1), wherein the negative lens of the first lens group is configured by a negative meniscus lens that has a convex surface facing the object side.

(3) The zoom lens described in (1) or (2), wherein the first lens group is configured by a negative meniscus lens having a convex surface facing the object side and a positive meniscus lens having a convex surface facing the object side in order from the object side.

(4) The zoom lens described in any one of (1) to (3), wherein the following Conditional Equations (3) and (4) are satisfied.

$$nd3 < 1.75 \quad (3)$$

$$vd3 > 40 \quad (4)$$

Here, nd3 is a refractive index of the medium of the negative lens of the third lens group for the D line (wavelength 587.6 nm), and vd3 is the Abbe number of the medium of the negative lens of the third lens group for the D line (wavelength 587.6 nm).

(5) The zoom lens described in any one of (1) to (4), wherein the following Conditional Equation (5) is satisfied.

$$0.5 < f2/fw < 1.2 \quad (5)$$

Here, f2 is the focal length of the second lens group.

(6) The zoom lens described in any one of (1) to (5), wherein the fourth lens group is configured by one positive lens.

(7) The zoom lens described in any one of (1) to (6), wherein the second lens group is configured by a positive lens, a negative lens, and a positive lens in order from the object side.

(8) The zoom lens described in any one of (1) to (6), wherein the second lens group is configured by a positive lens, a positive lens, and a negative lens in order from the object side.

(9) An imaging apparatus including: a zoom lens that is configured by a first lens group that has negative refractive power, a diaphragm, a second lens group that has positive refractive power, a third lens group that has negative refractive power, and a fourth lens group that has positive refractive power, which are arranged in order from an object side; and an imaging device that converts an optical image formed by the zoom lens into an electrical signal, wherein the first lens group is configured by at least one negative lens and one positive lens, wherein the third lens group is configured by one negative lens, wherein, when power is changed from a wide angle end state to a telephoto end state, the first lens group, the second lens group, and the third lens group are moved in the direction of an optical axis, and the fourth lens group is fixed, and wherein, when focusing is performed, the third lens group is moved in the direction of the optical axis so as to satisfy the following Conditional Equations (1) and (2).

$$-2.8 < f3/fw < -0.5 \quad (1)$$

$$2.0 < f4/fw < 15.0 \quad (2)$$

Here, f3 is a focal length of the third lens group, f4 is a focal length of the fourth lens group, and fw is a focal length of the whole zoom lens system at infinite focusing in the wide angle end state.

The present disclosure contains subject matter related to that disclosed in Japanese Priority Patent Application JP 2011-031661 filed in the Japan Patent Office on Feb. 17, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A zoom lens comprising:
   a first lens group that has negative refractive power;
   a diaphragm;
   a second lens group that has positive refractive power;
   a third lens group that has negative refractive power; and
   a fourth lens group that has positive refractive power,
      which are arranged in order from an object side,
   wherein the first lens group is configured by at least one negative lens and one positive lens,
   wherein the third lens group is configured by one negative lens,
   wherein, when power is changed from a wide angle end state to a telephoto end state, the first lens group, the second lens group, and the third lens group are moved in the direction of an optical axis, and the fourth lens group is fixed,
   wherein, when focusing is performed, the third lens group is moved in the direction of the optical axis so as to satisfy the following Conditional Equations (1) and (2), $$-2.8 < f3/fw < -0.5 \quad (1)$$

$$2.0 < f4/fw < 15.0 \quad (2)$$

wherein, f3 is a focal length of the third lens group, f4 is a focal length of the fourth lens group, and fw is a focal length of the whole zoom lens system at infinite focusing in the wide angle end state,
   wherein, the first lens group, the second lens group, the third lens group and the fourth lens group are arranged in this order from an object side to an image side,
   wherein the fourth lens group is disposed at a fixed position away from a reference image surface towards the object side and remains at the fixed position when the first lens group, the second lens group and the third lens group move away from the fourth lens group to transition the zoom lens from the wide angle end state to the telephoto end state, wherein the third lens group is operative to move towards the object side or towards the image side between the second lens group and the fourth lens group when the zoom lens is in the wide angle end state, the telephoto end state or anywhere therebetween, wherein the negative lens of the first lens group is configured by a negative meniscus lens that has a convex surface facing the object side, wherein the fourth lens group is configured by one positive meniscus lens that has a concave surface facing the object side and wherein the following Conditional Equations (3) and (4) are satisfied, $$nd3 < 1.75 \quad (3)$$

$$vd3 > 40 \quad (4)$$

wherein, nd3 is a refractive index of the medium of the negative lens of the third lens group for the D line (wavelength 587.6 nm), and vd3 is the Abbe number of the medium of the negative lens of the third lens group for the D line (wavelength 587.6 nm).

2. The zoom lens according to claim 1, wherein the first lens group is configured by a negative meniscus lens having a convex surface facing the object side and a positive meniscus lens having a convex surface facing the object side in order from the object side.

3. The zoom lens according to claim 1, wherein the following Conditional Equation (5) is satisfied, $$0.5 < f2/fw < 1.2 \quad (5)$$

wherein, f2 is the focal length of the second lens group.

4. The zoom lens according to claim 1, wherein the second lens group is configured by a positive lens, a negative lens, and a positive lens in order from the object side.

5. The zoom lens according to claim 1, wherein the second lens group is configured by a positive lens, a positive lens, and a negative lens in order from the object side.

6. An imaging apparatus comprising:

a zoom lens that is configured by a first lens group that has negative refractive power, a diaphragm, a second lens group that has positive refractive power, a third lens group that has negative refractive power, and a fourth lens group that has positive refractive power, which are arranged in order from an object side; and an imaging device that converts an optical image formed by the zoom lens into an electrical signal, wherein the first lens group is configured by at least one negative lens and one positive lens, wherein the third lens group is configured by one negative lens;

wherein, when power is changed from a wide angle end state to a telephoto end state, the first lens group, the second lens group, and the third lens group are moved in the direction of an optical axis, and the fourth lens group is fixed, wherein, when focusing is performed, the third lens group is moved in the direction of the optical axis so as to satisfy the following Conditional Equations (1) and (2), $$-2.8 < f3/fw < -0.5 \quad (1)$$

$$2.0 < f4/fw < 15.0 \quad (2)$$

wherein, f3 is a focal length of the third lens group, f4 is a focal length of the fourth lens group, and fw is a focal length of the whole zoom lens system at infinite focusing in the wide angle end state, wherein, the first lens group, the second lens group, the third lens group and the fourth lens group are arranged in this order from an object side to an image side, wherein the fourth lens group is disposed at a fixed position away from a reference image surface towards the object side and remains at the fixed position when the first lens group, the second lens group and the third lens group move away from the fourth lens group to transition the zoom lens from the wide angle end state to the telephoto end state, wherein the third lens group is operative to move towards the object side or towards the image side between the second lens group and the fourth lens group when the zoom lens is in the wide angle end state, the telephoto end state or anywhere therebetween, wherein the negative lens of the first lens group is configured by a negative meniscus lens that has a convex surface facing the object side, wherein the fourth lens group is configured by one positive meniscus lens that has a concave surface facing the object side and wherein the following Conditional Equations (3) and (4) are satisfied, $$nd3 < 1.75 \quad (3)$$

$$vd3 > 40 \quad (4)$$

wherein, nd3 is a refractive index of the medium of the negative lens of the third lens group for the D line (wavelength 587.6 nm), and vd3 is the Abbe number of the medium of the negative lens of the third lens group for the D line (wavelength 587.6 nm).

* * * * *